(12) United States Patent
Elter et al.

(10) Patent No.: US 9,143,911 B2
(45) Date of Patent: Sep. 22, 2015

(54) METHOD AND APPARATUS FOR TRANSFERRING A COMMUNICATION CALL

(75) Inventors: James Elter, Flemington, NJ (US); Yeharn Hwang, Broomall, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 39 days.

(21) Appl. No.: 13/407,580

(22) Filed: Feb. 28, 2012

(65) Prior Publication Data
US 2013/0225235 A1 Aug. 29, 2013

(51) Int. Cl.
*H04W 4/16* (2009.01)
*H04W 84/16* (2009.01)
*H04W 88/02* (2009.01)

(52) U.S. Cl.
CPC ............... *H04W 4/16* (2013.01); *H04W 84/16* (2013.01); *H04W 88/02* (2013.01)

(58) Field of Classification Search
USPC ........................................ 455/555; 379/93.09
See application file for complete search history.

(56) References Cited

U.S. PATENT DOCUMENTS

| 8,345,838 | B2 * | 1/2013 | Becker | 379/93.09 |
| 2003/0058806 | A1 * | 3/2003 | Meyerson et al. | 370/260 |
| 2010/0128709 | A1 * | 5/2010 | Liu et al. | 370/338 |
| 2011/0053643 | A1 * | 3/2011 | Shmunis | 455/556.1 |
| 2011/0300900 | A1 * | 12/2011 | Fleming et al. | 455/555 |

FOREIGN PATENT DOCUMENTS

GB  2446306 A  *  8/2008  ............. H04M 3/42

* cited by examiner

*Primary Examiner* — Junpeng Chen

(57) ABSTRACT

A docking mechanism is disclosed that is used to establish a network connection between a mobile device and an enterprise Private Branch Exchange (PBX). Once docked, a mobile unified communication integrated dialer (MUCID) is able to be used to select between carrying a communications call over a land line (through the PBX system) or a mobile telephone line (through a cellular communication network). User mobility is provided by allowing a docked mobile device to be undocked either using a trigger on the docking station or via a UI interface on the mobile device and transfer an active call being carried over the PBX onto the mobile device.

18 Claims, 8 Drawing Sheets

METHOD AND APPARATUS FOR TRANSFERRING A COMMUNICATION CALL

BACKGROUND

Many business establishments use a private branch exchange (PBX) system to make connections among their internal telephone lines and connect the internal lines to a public switched telephone network (PSTN). A PBX system often includes extensions to other devices such as fax machines, modems, etc. Further, many PBX systems include extensions to mobile devices (e.g., cellular phones, smart phones, etc.). The PBX extension to mobile allows the users to use their mobile devices as virtual extensions of the PBX and benefit from features of PBX, such as single number reachability (SNR) and simultaneous ringing. For example, using the single number reachability feature of PBX, an office worker using the PBX extension to mobile may use his/her personal cell phone to receive business calls incoming to his/her office phone. Similarly, using the simultaneous ringing feature of PBX, the office worker's business phone and cell phone ring simultaneously so that he/she can receive calls incoming to his/her office phone at his/her cell phone.

Due to the increasing number of individuals that spend time away from their work environments, either by telecommuting, working from client locations, or working while traveling, many business establishments have been moving away from their traditional settings and investing in providing their employees with mobile and remote communications capabilities. Although, features such as the PBX extension to mobile may be used, existing features are costly to set up and do not provide the user with the ability to access their personal number and their business number using their smart phone.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
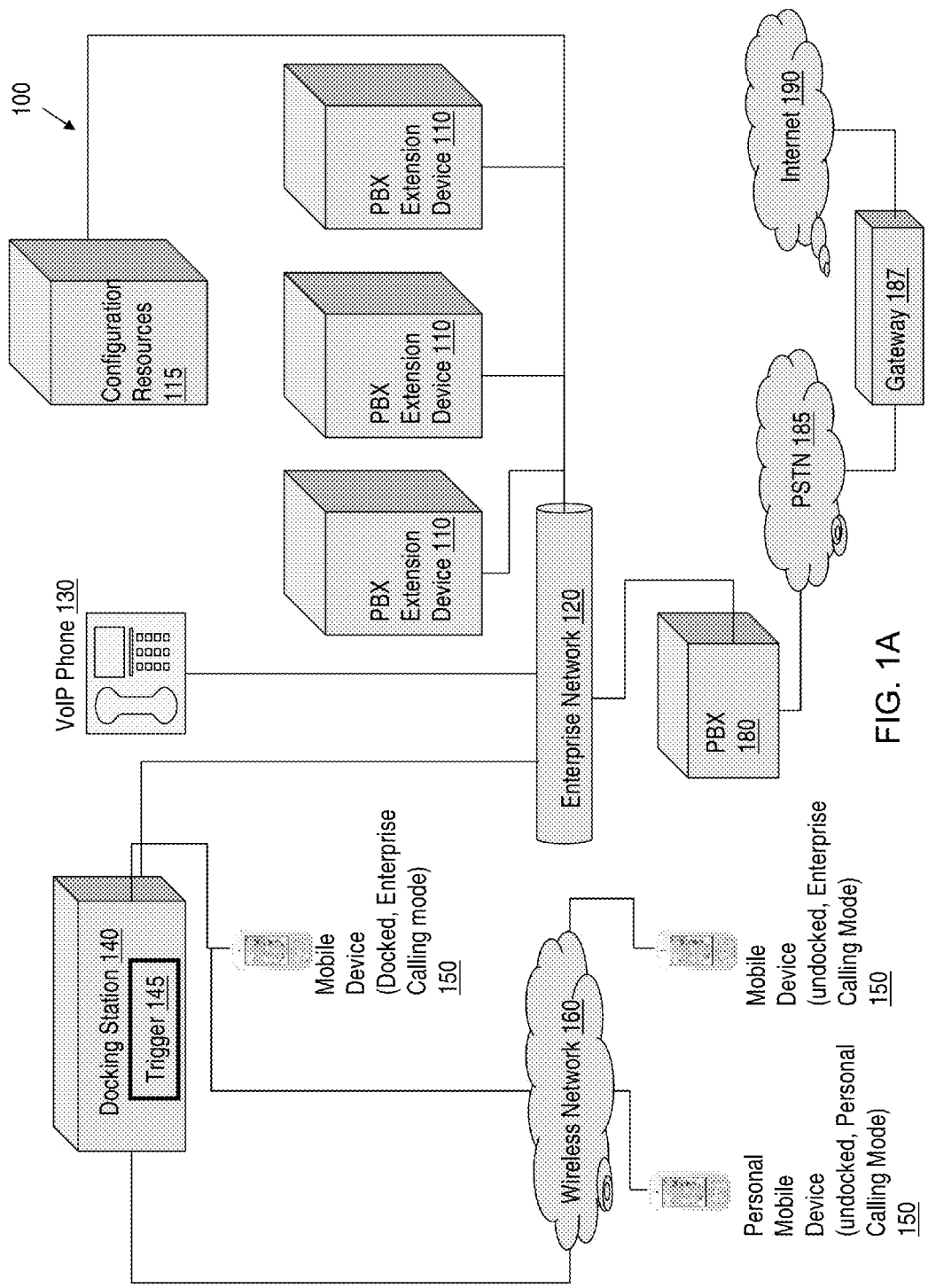
FIG. 1A is an illustration of a perspective view of an example embodiment for transferring a communication call.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain embodiments disclosed herein relate to a unified communication integrated dialer system. Certain embodiments relate to a system that includes a docking station and a trigger. The docking station establishes a network connection between a mobile device (also referred to herein as a mobile device or mobile phone) and an enterprise Private Branch Exchange (PBX). The trigger initiates transferring of a communication call between the mobile device and the PBX via an established network connection between the PBX and the docking station. Some embodiments disclosed herein further relate to an intelligent docking and undocking selection algorithm for selecting a telephony network. Certain other embodiments disclosed herein relate to a dock/undock trigger (e.g., dock/undock button, touchpad, or the like) that may be used on the intelligent docking station. Some embodiments relate to a user interface on the mobile device that is used to facilitate removal (i.e., undock) of the mobile device from a docking station prior to transferring a communication call from a PBX communications device to the mobile device.

In some embodiments the trigger, upon activation, initiates transferring of a communication call initiated on the mobile device over the PBX via the established network connection. In some embodiments, the trigger, upon activation, initiates transferring of an active communications call being carried over the PBX to the mobile device via the established network connection. The trigger is arranged to issue an indication of completion of the transferring of the communication call.

Certain embodiments relate to a system that includes a docking station that establishes a network connection among a plurality of communications devices. The communications devices include a mobile device and a PBX communications device connected to an enterprise PBX. The trigger initiates transferring a communication call between the enterprise PBX communications device and the mobile device via the established network connection.

Some embodiments relate to establishing a network connection among a plurality of communications devices and initiating transferring of a communication call between the enterprise PBX communications device and the mobile device via the established network connection. The communications devices include a mobile device and a PBX communications device connected to an enterprise PBX.

Reference now is made in detail to the examples illustrated in the accompanying drawings and discussed below.

FIG. 1A is an illustration of a perspective view of an example embodiment 100 for mobile Unified Communication (UC). The Mobile Unified Communication described herein provides the enterprise desk phone user the ability to extend a fixed mobile convergence (FMC) experience to a wireless phone experience.

As illustrated in FIG. 1A, an enterprise (e.g., business, home, etc.) uses a PBX 180 (e.g., a voice over Internet Protocol (VoIP) PBX or a legacy PBX) to connect multiple elements within the enterprise to a Public Switched Telephone Network (PSTN) 185. The PSTN 185 may further connect through a gateway 187 to the Internet 190. The elements within the enterprise include, but are not limited to, VoIP phone 130, configuration resources 115 (e.g., corporate voice mail, simple network management protocol (SNMP), light weight directory access control (LDAP), active directory (AD), etc.), and other elements (PBX Extension Devices) 110 such as fax machines, telephones, and modems. The elements connected using a PBX 180 are generally referred to as "extensions." These elements may be connected to the PBX 180 via an enterprise network 120.

A docking station 140 is also connected to the enterprise network 120. The docking station 140 is used to establish both a physical (i.e., dock) and a network connection between a mobile communications device 150 and the PBX 180 via the enterprise network 120. In some embodiments, the docking station 140 includes a physical interface (not shown) that is used to dock and connect the mobile communications device 150 to the PBX 180 via the enterprise network 120. In some embodiments, the physical interface includes a Universal Serial Bus (USB) connection (not shown).

As shown in FIG. 1A, at any given time, the mobile communications device 150 may be in the docked state or undocked state. In the docked state, the mobile communications device 150 is connected, through the docking station 140 and enterprise network 120, to the enterprise PBX 180.

When in the undocked state, the mobile communication device 150 is no longer connected to the enterprise PBX 180. However, the user is still given the option of selecting between an enterprise calling mode and a personal calling mode. If the personal calling mode is selected, the communication call is carried over the wireless network 160. If the enterprise calling mode is selected, a two-stage dialing process (details of which are provided later with reference to FIG. 2B) that bridges the call through the enterprise PBX 180 is employed.

In certain embodiments, the docking station 140 includes a trigger 145 such as a button or touch pad that is used to initiate or terminate the docking process. Specifically, a user may dock his/her personal mobile/business communications device 150 into the docking station 140 by establishing a physical connection to the docking station 140 via a USB connection. Once docked, the docking station 140 establishes a connection between the personal mobile/business communications device 150 and the PBX 180 via the enterprise network 120. Once a connection to the PBX 180 is established (i.e., docked), a mobile device number (MDN) call forwarding feature is automatically activated, by the mobile device 150, to direct the incoming calls to the MDN of the mobile communications device 150 to the enterprise Direct Inward Dialing (DID) of the PBX. Further, the mobile device 150 and any PBX communication devices linked to the mobile device 150 may include a simultaneous ringing feature that causes the mobile device 150 and its linked PBX devices to ring simultaneously. In such situations, simultaneous ringing feature of any PBX device (e.g., VoIP phone 130) that may have been linked to the mobile communications device 150 is also disabled.

Once simultaneous ringing is disabled, the mobile communications device 150 configuration file may be obtained from the configuration resources 115 of the enterprise network 120 and applied to the mobile communications device 150, as desired. If an updates to an existing mobile communication device 150 configuration file are available, the most recently updated configuration file may be applied. Corporate directory access may also be configured and controlled via LDAP of configuration resources 115, if needed. Further, the mobile communications device 150 may be registered as a third party Session Initiation Protocol (SIP) agent (not shown) via the enterprise PBX 180. If a connection to the wireless network is weak or unavailable, the mobile communications device continues to search for coverage and subsequently performs MDN call forwarding and disabling of the simultaneous ringing at a later time.

Once MDN forwarding, disabling of the simultaneous ringing, and SIP registration are completed, the trigger 145 issues an indication of completion of these steps. In some embodiments, the indication is a visual indication. For example, in certain embodiments, the trigger 145 may change color (e.g., turn amber from red or green). Completion may additionally be audibly conveyed via mobile device 150PD, 150BD and/or docking station 140.

The mobile device 150 is now in a docked state (also referred to as desk phone mode). The docked state herein refers to instances in which the phone is physically and communicatively connected to the docking station 140, the communication is enabled on the enterprise PBX 180 and the mobile device 150 is registered with an SIP via the enterprise PBX 180.

The docked mobile device 150 is now able to handle calls that have been anchored on the enterprise PBX 180. Calls handled in this mode are referred to herein as Enterprise Calls.

The docking station 140 provides a user with a single interface when using mobile and PBX network, thereby removing the need for a user to constantly have to transition between using different interfaces for the two mediums and providing the users with the ability to extend their fixed mobile convergence experience to the enterprise desk phone user.

In the docked state, a docked mobile communications device 150 accesses the enterprise PBX 180 and provides cost-saving VoIP-based voice service as minutes of a mobile device calling plan associated with the mobile device 150PD, 150BD are not used. When the mobile device 150PD, 150BD is docked to the enterprise PBX 180 all of the phone calls of the mobile device 150PD, 150BD are made/received via the enterprise PBX 180 telephony system and the mobile device 150 is able to use many of the commonly used features of the enterprise PBX. This provides a user with a desk phone replacement solution and a single device enterprise experience, permitting the mobile device 150PD, 150BD to be used in a variety of inter- and intra-office locations.

As above, allowing a mobile device 150 to be docked provides the user with a unified experience inside and outside of the enterprise. The mobile device 150, while in the docked state, utilizes enterprise Ethernet connectivity and/or VoIP connectivity and uses cellular connectivity (via wireless network 160) when in the mobile/undocked state 150. When in the docked state, the mobile device 150 may be able to use features of the enterprise available only to phones physically connected with the enterprise system, such features may not be available when in the undocked state. For example, the mobile device 150 may able to access enterprise visual voice mail, view enterprise call logs, and access corporate directories only when docked.

Referring back to FIG. 1A, the trigger 145 is also used to undock the mobile communications device from the enterprise PBX 180. In certain embodiments, the undocking may be in response to activation of the trigger 145. In certain embodiments, the undocking may be triggered by a user selecting an undock option from a user interface of the mobile device 150.

Regardless of how undocking is initiated (e.g., in response to activation of the trigger 145 or by selecting an undock option on a user interface of the mobile device), the initiation of undocking triggers deactivation of the previously activated MDN forwarding feature. Further, the simultaneous ringing feature of any PBX device (e.g., VoIP phone 130) that may have been linked to the mobile device 150 is also enabled. Call transfer to MDN is also activated, if needed.

In some embodiments, the trigger (e.g., undock button) 145 then issues an indication of completion of these steps. In certain embodiments, the indication is a visual indication. For example, in certain embodiments, the trigger 145 may change color (e.g., turn green). The mobile device 150 may now be undocked. In the undocked state, the mobile device 150 is utilizing the wireless (i.e., cellular) network 160 for all communications.

Figure 1B:
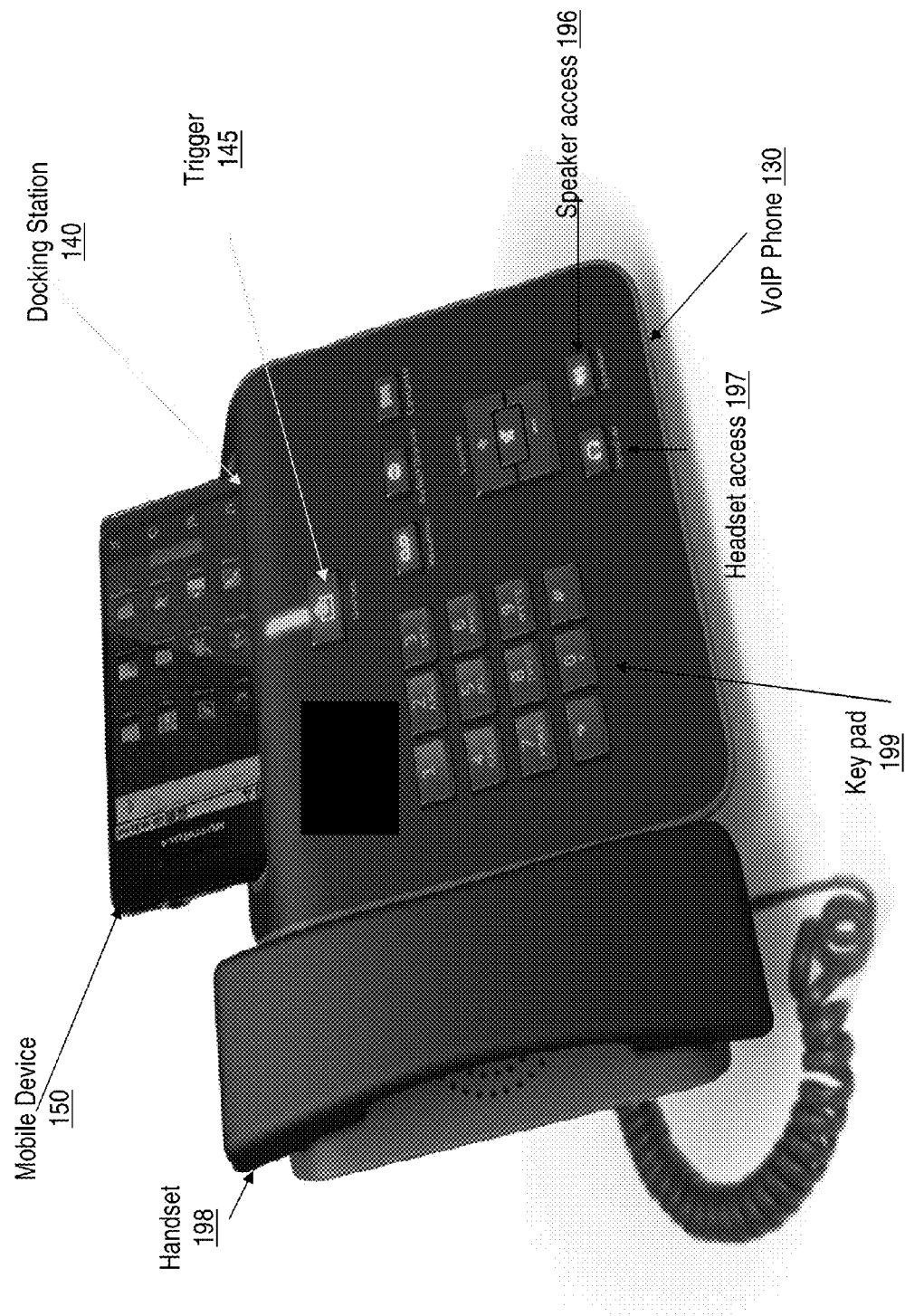
FIG. 1B is an illustration of an example embodiment disclosed herein.

FIG. 1B is an illustration of an example of an embodiment disclosed herein. In some embodiments, the docking station 140 is coupled with a PBX extension device 110. As shown, the PBX extension device 110, in certain embodiments, such as a VoIP Phone 130, includes audio and interface capabilities, such as a handset 198, and/or a keypad 199. The keypad 199 may include functionalities for accessing PBX features (e.g., voice mail, do not disturb, conference, etc.). Access to speakers 196 and headsets 197 may also be offered through the VoIP Phone 130. The docking station is coupled with a trigger 145 (labeled as the undock button in the embodiment shown in FIG. 1B) that is used in removing the physical connection established between the mobile device 150 and the docking station 140.

Figure 2A:
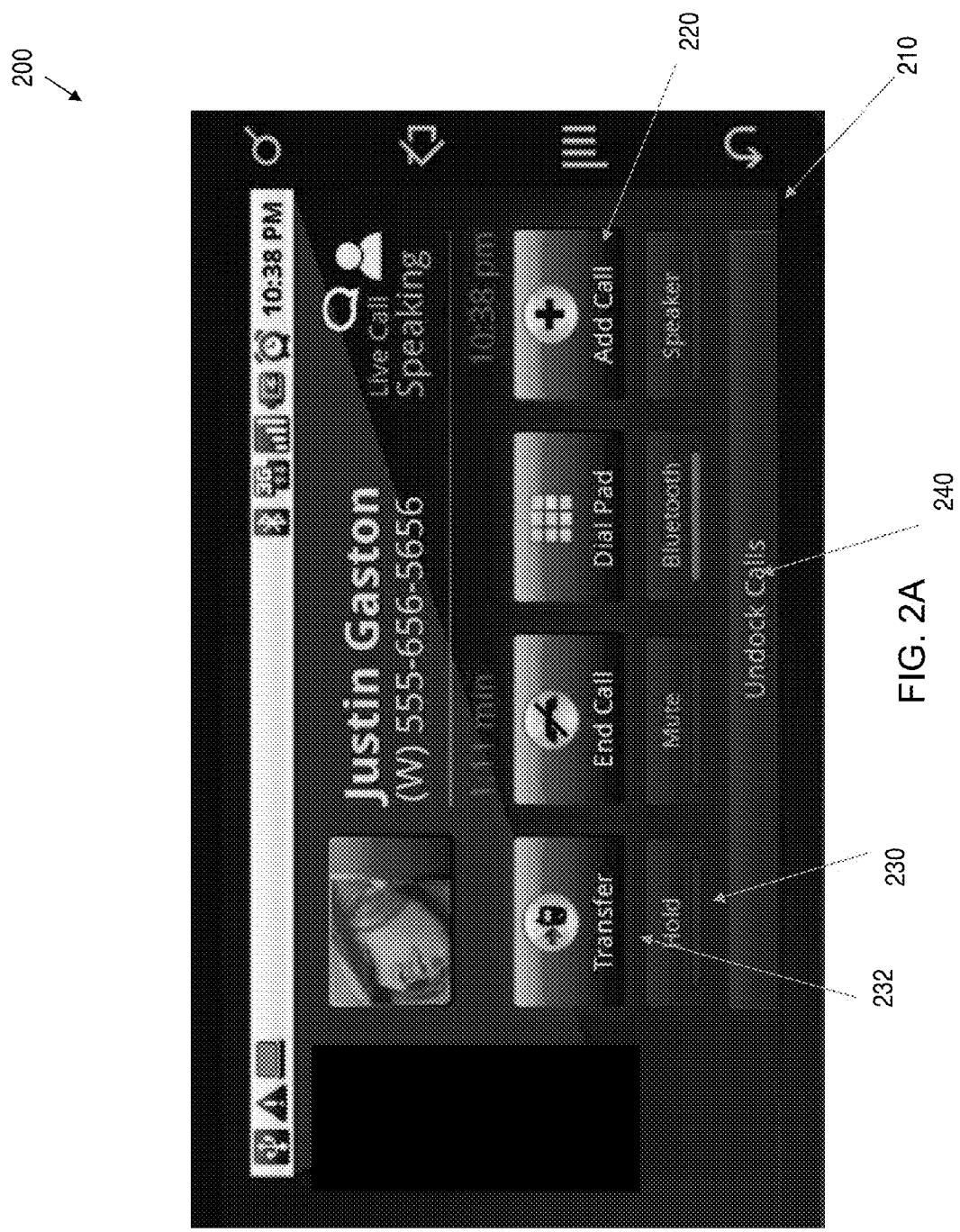
FIG. 2A is an example of a mobile Unified Communications (UC) Integrated Dialer according to embodiments disclosed herein.

FIG. 2A is an example of a Mobile Unified Communications (UC) Integrated Dialer interface 200 displayed on the mobile device that may be used with the embodiments disclosed herein. The mobile UC Integrated Dialer interface 200 provides a universal dialing user interface that provides a user with the same dialing experience every time the dialer used, regardless of the dialing mode selected. The mobile UC Dialer interface 200 is similar to the native dialer provided by the mobile device. In this way, a mobile device user can use his/her mobile device to place and receive business and personal calls even while docked at the docking station 140. As above, when the mobile device is docked and functioning as a PBX Desk phone, the mobile device utilizes its connection to the PBX system, which is provided by the docking station 140, to access features of enterprise PBX such as VoIP-based voice services.

The mobile UC Integrated Dialer interface 200 provides a menu access 210 to common PBX features (e.g., Add Call or Call Conferencing 220, Call Hold 230, Call Transfer 232, etc.). The mobile UC Integrated Dialer interface 200 also allows a user to undock a call 240 from the dialer menu. Further, mobile UC Integrated Dialer interface 200 provides an interface to a mobile UC Integrated Dialer application (not shown) that, depending on the calling mode (personal or enterprise) and docking state (docked or undocked) of the mobile device, selects an appropriate signal path, which is transparent to the user, to deliver calls and features. This selection is transparent to the user.

In some embodiments, the mobile UC Integrated Dialer application is a smart phone application that functions as an integrated dialer to support Business and Mobile calls. In some embodiments, the UC integrated dialer application provides a mobile device user with the required functionalities (e.g., touch screen buttons) for selecting between personal and enterprise calling modes. The enterprise mode calls are placed through the PSTN system connected to the enterprise PBX and personal mode calls are carried directly through the mobile network.

As noted above, in some embodiments, the undock calls feature 240 of the mobile UC Integrated Dialer interface 200 is used to undock a mobile device from the enterprise BPX 180, rather than the trigger on the docking station. If there is an active call taking place at the time the phone is undocked, the docked mobile device provides the option of transferring the active call from the PBX system to the cellular network, thereby providing call continuity.

In certain embodiments, when the undock feature of the mobile UC Integrated Dialer interface 200 is selected, the mobile UC Integrated Dialer interface 200 may prompt the user for confirmation. In some embodiments, if the user confirms via the mobile UC Integrated Dialer interface 200 that the mobile device is, in fact, intended to be undocked, in response to detecting this confirmation the mobile device proceeds to undock the mobile device from the docking station and, when this activity is completed, issues a confirmation (e.g., via a display on the mobile device and/or docking station) signaling the completion of the undocking of the mobile phone. In certain embodiments, if an active call is in progress, the mobile UC Integrated Dialer interface 200 may prompt the user and request instructions for transferring the active call. If the mobile device detects a user input via the mobile UC Integrated Dialer interface 200 indicating that the call is not to be transferred, the call is dropped. In some embodiments, if the mobile device detects a user input via the mobile UC Integrated Dialer interface 200 indicating that the call is to be transferred, the mobile UC Integrated Dialer interface 200 displays a confirmation of the transfer of the call upon completion of the transfer. In some embodiments, the mobile UC Integrated Dialer interface 200 may issue a signal to the user during the transfer of the call (e.g., display a screen indicating that the call is being transferred).

Although not shown in FIG. 2A, in certain embodiments, the mobile UC Integrated Dialer interface 200 includes the functionality (e.g., touch screen buttons) for prompting a user to select among the different calling modes (e.g., enterprise mode or personal mode) or the functionality (e.g., icons) illustrating the calling mode that is actively being used.

Figure 2B:
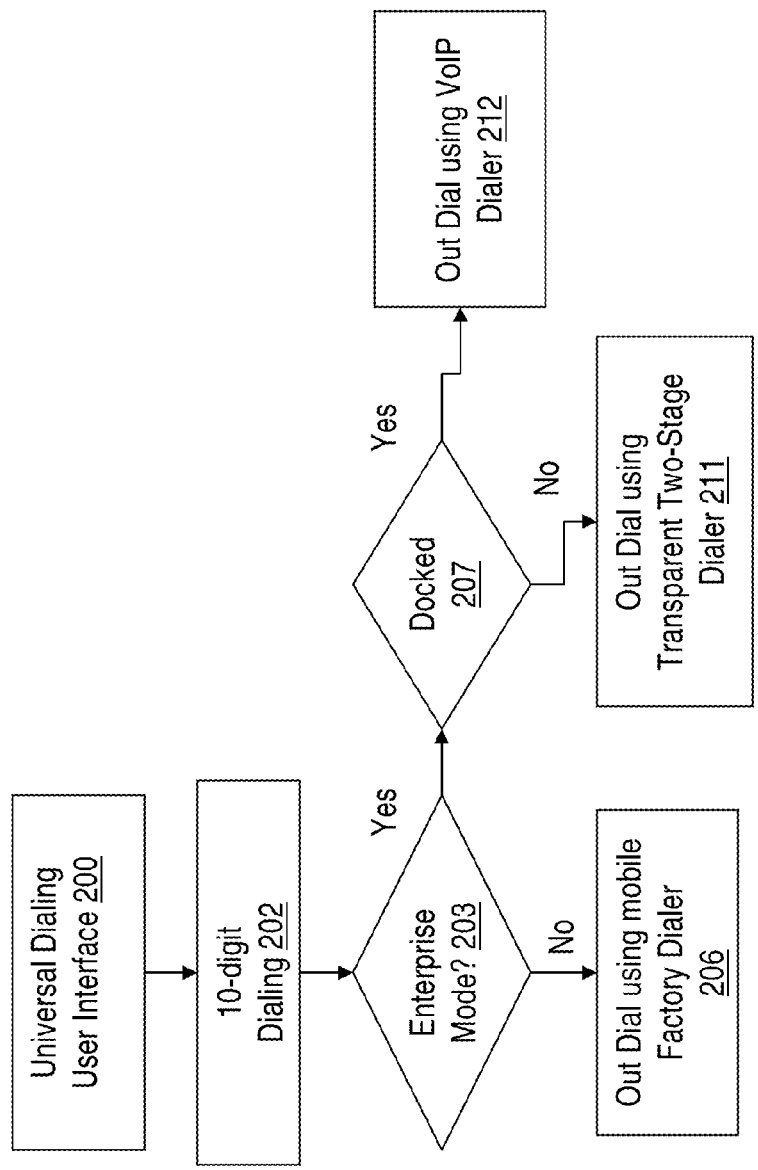
FIG. 2B is a flow diagram of procedures associated with a mobile UC Integrated Dialer application having an interface shown in FIG. 2A.

FIG. 2B is a flow diagram of the procedures associated with the mobile UC Integrated Dialer application having the interface 200 shown in FIG. 2A.

The UC Integrated Dialer Interface 200 assists a user (not shown) with completing calls under various calling modes (e.g., enterprise calling mode and personal calling mode) and provides a consistent user experience while maintaining a unique interface every time a call is made. As shown in FIG. 2A, the UC Integrated Dialer Interface 200 is used to initiate a communication request (e.g., make a 10-digit dialing call) 202.

Although the term "phone call" is used herein to collectively refer to any type of communication call made using embodiments disclosed herein, this term does not limit the embodiments to a traditional phone call. Any type of communications request known in the art may be initiated using the disclosed embodiments.

Once a communication call request is made (e.g., by entering a 10-digit phone number 202), the UC Integrated Dialer application (not shown) determines whether or not the mobile device is operating in an enterprise mode 203. The enterprise mode refers to when the mobile device is in docked state and is thus handling calls that have been anchored on the PBX system. If it is determined that the mobile device is not in the enterprise mode, in response the mobile Factory Dialer 206 is used to complete the call. The mobile Factory Dialer 206 is a native dialer, provided by manufacture, and is used as the default dialer for cellular network voice services.

If it is determined that the mobile device is in the enterprise mode, the mobile UC Integrated Dialer application in response determines whether or not the mobile device is docked to the enterprise PBX 180 (FIG. 1A) 207. If it is determined that the mobile device is not docked, in response the call is completed using a transparent Two-Stage Dialer 211. The transparent Two-Stage Dialer is a single-number native dialer that bypasses the two-stage dialing process associated with the PBX system and allows the mobile device to access Enterprise PBX features when in the undocked state. The transparent two-stage dialer 211 described herein eliminates dialing of the Enterprise Access Number before entering the called party number to complete the call, thereby making the two stage dialing process transparent to the user. The transparent Two-Stage Dialer uses the wireless/cellular network 160 (FIG. 1A) as the primary access medium for voice services.

Specifically, in a two-stage dialing process, to access the enterprise PBX 180 (FIG. 1A), the Enterprise Access Number is dialed at the mobile device, the communications device and/or user is authenticated, and then a dial tone is provided by the enterprise PBX 180 (FIG. 1A). After receiving the dial tone provided by the enterprise PBX 180 (FIG. 1A), a second set of digits for a called party (not shown) is entered at the mobile device to complete the call. After receiving the second set of numbers for a called party, the enterprise PBX 180 (FIG. 1A) suspends the first stage of the call (i.e., from the mobile device to the Enterprise Access Number) and uses the second set of numbers to call the called party. Once the called party answers the phone, the enterprise PBX 180 (FIG. 1A) bridges and completes the call. The transparent two-stage dialer 211 eliminates dialing of the Enterprise Access Number before entering the called party number to complete the call.

Referring back to FIG. 2B, if the UC Integrated Dialer application determines that the mobile device is docked to the enterprise PBX 180 (FIG. 1A), a VoIP dialer is employed to complete the call 212. The VoIP dialer is an SIP-compliant dialer that allows the mobile device to function and behave as an enterprise desk phone when in the docked state. The VoIP dialer uses the enterprise PBX 180 (FIG. 1A) infrastructure as the primary access medium for voice services. Further, the VoIP dialer accesses the enterprise voice services via the network interface provided by the docking station 140 (FIG. 1A). Therefore, a called party number can be entered either via the dialer on the mobile device or via a traditional keypad that integral with the docking station and enterprise PBX features are able to be accessed in a manner similar to a standard enterprise desk phone.

Figure 2C:
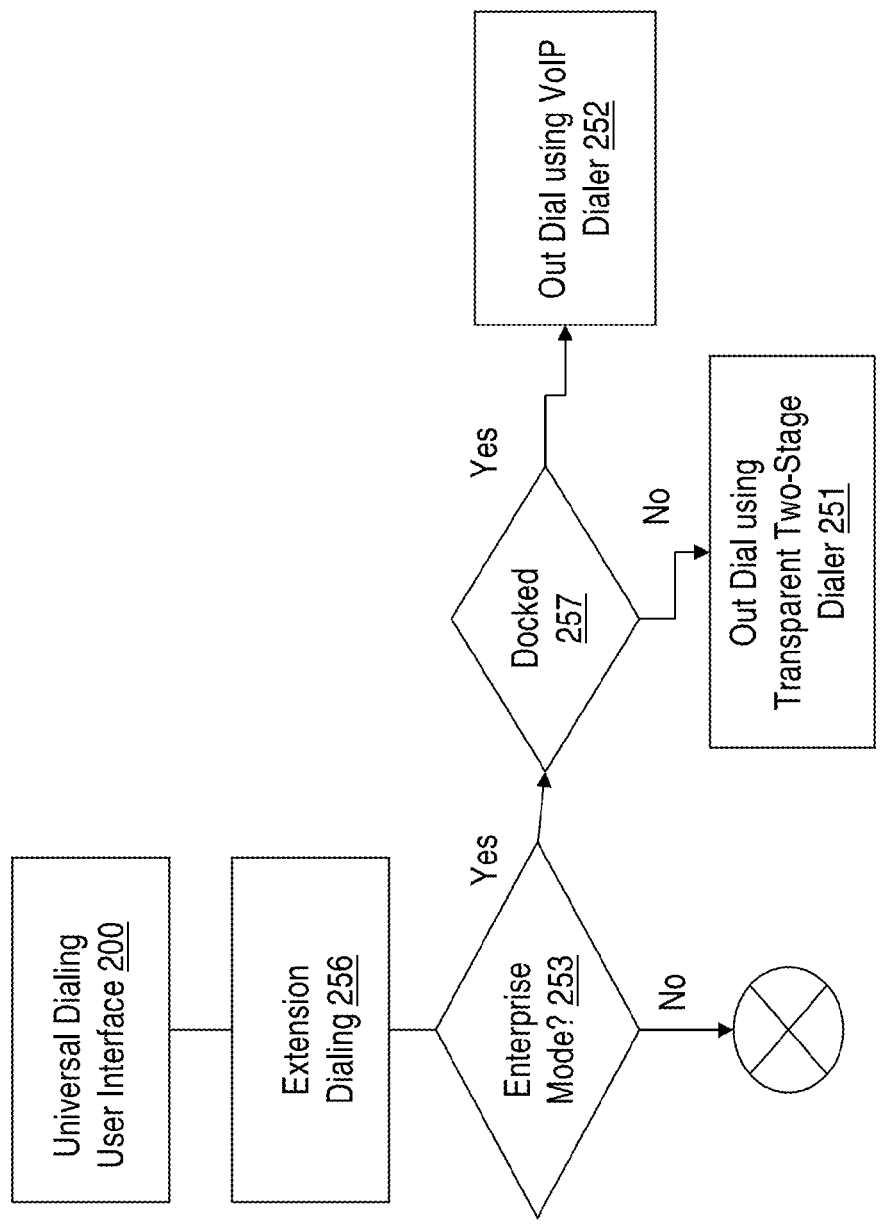
FIG. 2C is a flow diagram of further procedures associated with a mobile UC Integrated Dialer application having an interface shown in FIG. 2A.

FIG. 2C is a flow diagram of further procedures associated with a mobile UC Integrated Dialer application having an interface shown in FIG. 2A.

As noted above, the UC Integrated Dialer Interface 200 assists a user (not shown) with completing calls under various calling modes and provides a consistent user experience while maintaining a unique interface when a call is made. In some embodiments, the UC integrated Dialer Interface 200 is used to make communication calls to other extension within the PBX, thereby providing a mobile user a calling experience similar to that offered by a desktop PBX device. When a request for an extension call is made 256 (e.g., by entering a PBX extension number), the UC Integrated Dialer application (not shown) determines whether or not the mobile device is operating in an enterprise mode 253. If it is determined that the mobile device is not in the enterprise mode, in response an extension call from the mobile device 150 may not be completed. In certain embodiments, the UC Integrated Dialer Interface 200 may issue a visual and/or audible indication via the mobile device and/or docking station to relay the failure of the extension dialing. If it is determined that the mobile device is in the enterprise mode, the mobile UC Integrated Dialer application determines whether or not the mobile device is docked to the enterprise PBX 180 (FIG. 1A) 257. If it is determined that the mobile device is not docked, in response the call is completed using a transparent Two-Stage Dialer 251. As explained above, the transparent Two-Stage Dialer is a single-number native dialer that bypasses the two-stage dialing process and allows the mobile user to access Enterprise PBX features when mobile user is in the undocked state. The transparent Two-Stage Dialer uses the wireless/cellular network 160 (FIG. 1A) as the primary access medium for voice services.

If the mobile UC Integrated Dialer application determines that the mobile device is docked to the enterprise PBX 180 (FIG. 1A), in response a VoIP dialer is employed to complete the call 252. The VoIP dialer is an SIP-compliant dialer that allows the mobile device to function and behave as an enterprise desk phone when in the docked state and have access to PBX functions, such as extension dialing 256. The VoIP dialer uses the enterprise PBX 180 (FIG. 1A) infrastructure as the primary access medium for voice services.

Figure 3:
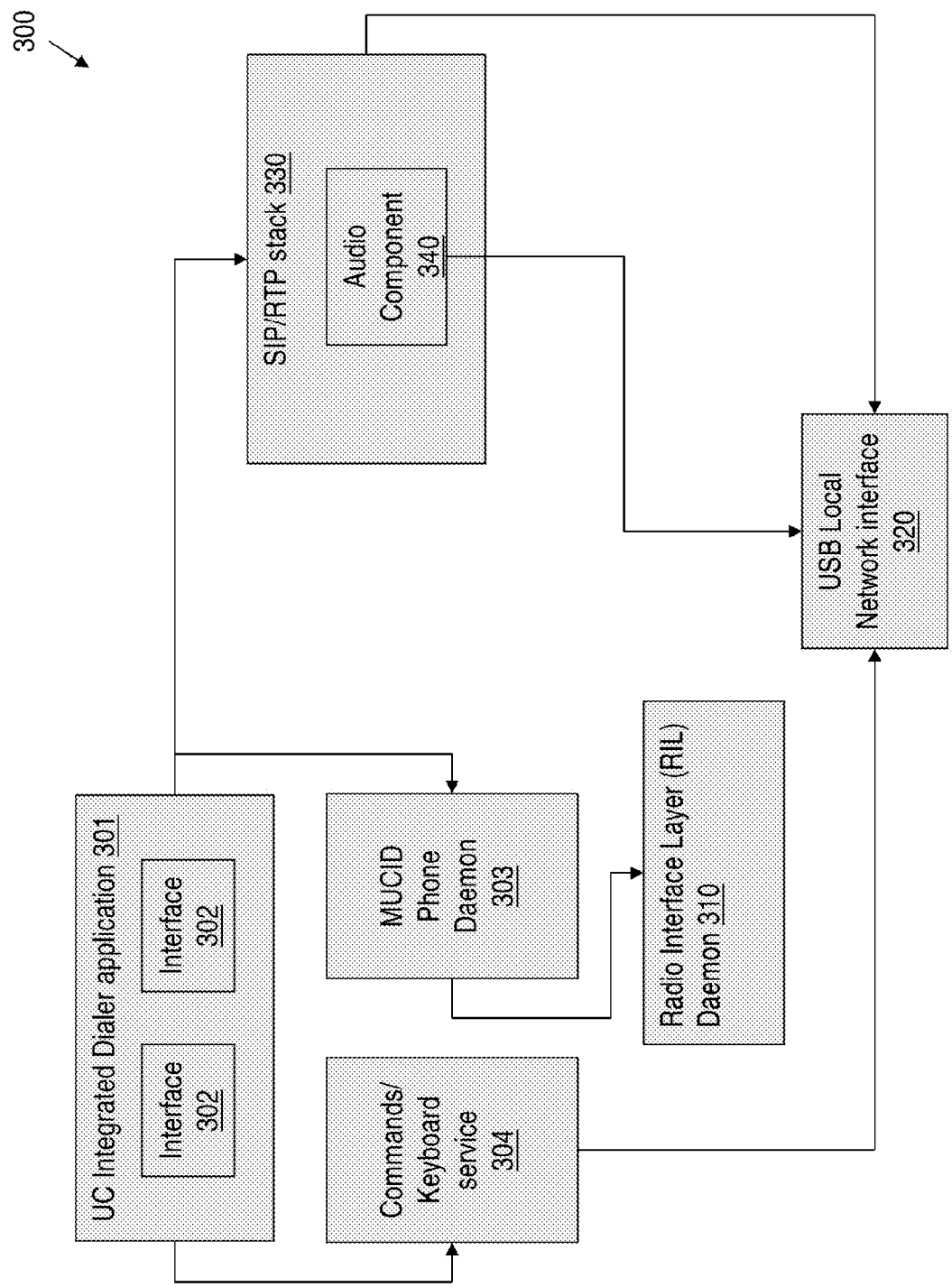
FIG. 3 is a high-level block diagram of a UC Integrated Dialer application having an interface shown in FIG. 2A.

FIG. 3 is a high-level block diagram 300 of a mobile UC Integrated Dialer (MUCID) application 301 that is installed in a mobile device (shown in various states in FIG. 1 and collectively referenced hereinafter using reference numerical 150) used with embodiments disclosed herein. The application 301 implements the commands/keypad service 304 and audio component 340 that are responsible for communication with the enterprise PBX 180 through a local network interface 320 provided via the docking station 140 (FIG. 1A). Specifically, the commands/keypad service 304 implements communications protocols that are used to communicate with the enterprise PBX 180 through the docking station 140 and the enterprise network 120 (FIG. 1A). For example, these communications protocols implement the commands for establishing an initial handshake between the mobile device 150 and the docking station 140, controlling keyboard events, controlling a light emitting diode (LED), and providing application level functions (e.g., Trivial File Transfer Protocol (TFTP) download, single network management protocol (SNMP) download, SNMP values exchange, network time protocol (NTP), etc.) on the mobile device 150.

The audio component 340 is responsible for handling of the bi-directional audio data stream to and from the docking station 140 (FIG. 1A). The audio component is implemented as a part of a media stack (not shown) and is arranged to communicate with an Audio Daemon (not shown) on the Docking Station 140 (FIG. 1A) through the local network interface 320.

The MUCID Phone Daemon 303 is responsible for the interface with a Radio Interface Layer (RIL) daemon 310 that provides the mobile device 150 with various functionalities (e.g., sending Dual Tone Multi Frequency (DTMF) and other cellular call control functions). The MUCID Phone Daemon 303 is signed by its original equipment manufacturer (OEM) and is pre-loaded onto the mobile device 150. The RIL daemon 310 is a software interface that is used in providing communications among the mobile device 150 and cellular/wireless networks 160 (FIG. 1A).

The Mobile UC Integrated Dialer Application 301 contains a SIP/Real Time Transport Protocol (RTP) stack 330 which is used to control communications sessions initiated by the mobile device to the Enterprise PBX.

Figure 4:
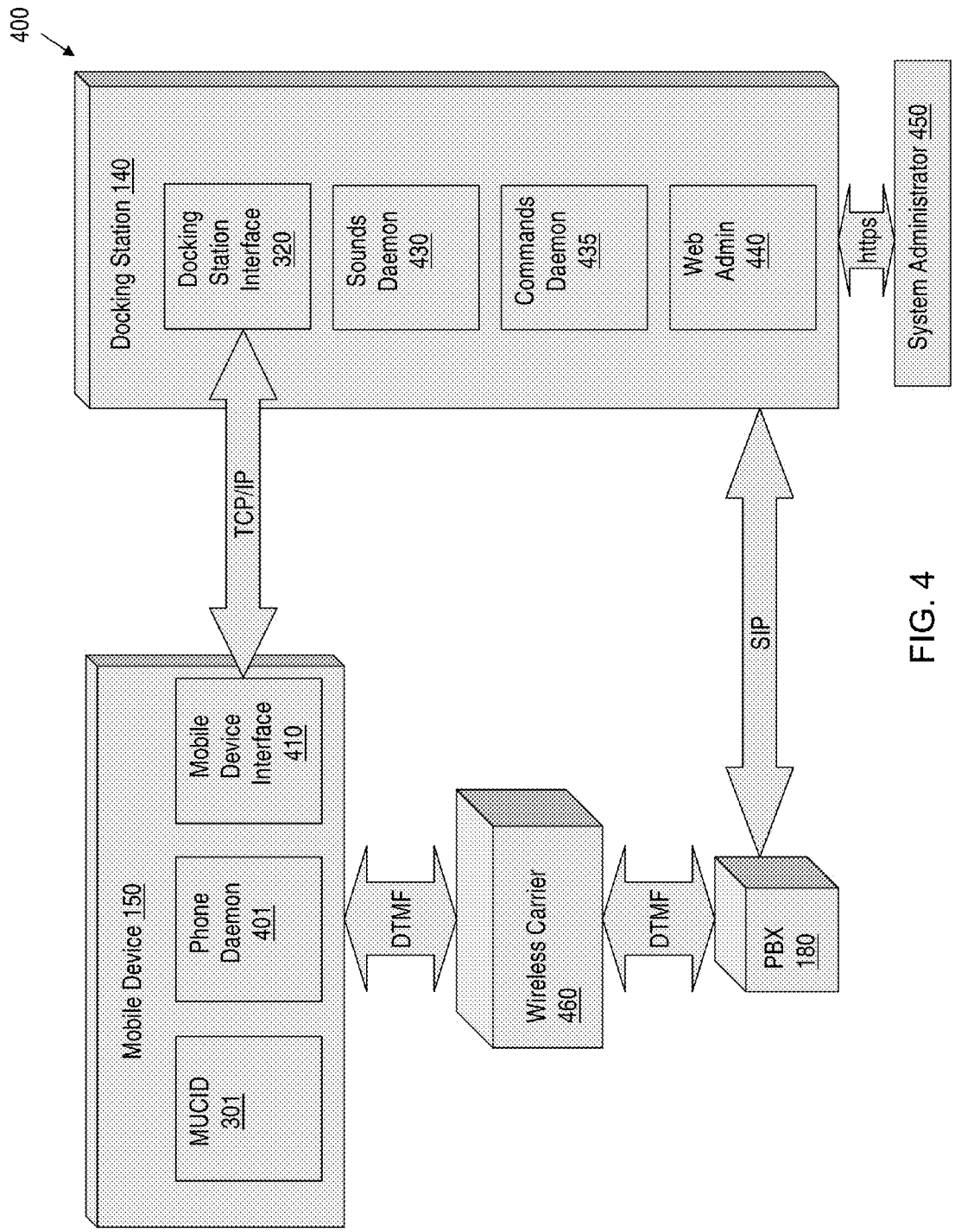
FIG. 4 is a block diagram of an example embodiment disclosed herein.

FIG. 4 is a block diagram of an example embodiment disclosed herein. The mobile device 150 includes the MUCID 301 (described earlier with reference to FIG. 2A, FIG. 2B, and FIG. 3), the phone daemon 401, and a mobile device interface 410. The MUCID 301 interfaces with the phone daemon 401 using inter-process communication (IPC) and android interface definition language (AIDL). The MUCID 301 also interfaces with the docking station through a Transmission Control Protocol/Internet Protocol (TCP/IP) connection made between the mobile device interface 410 and the docking station interface 320. In certain embodiments, the mobile device interface 410 and/or the docking station interface 320 are implemented using a USB connection. Further, the mobile device 150 interfaces with the enterprise PBX 180 through a wireless phone carrier 460 using DTMF. The phone daemon 401 uses an existing phone application programming interface (API, not shown) to access features, such as sending DTMF.

In addition to the docking station interface 320 that provides communications between the docking station 140 and the mobile device 150, the docking station 140 includes a sounds daemon 435, a commands daemon 430, and a web admin interface 440. The commands daemon 430 is used to send/receive commands to/from the MUCID 301. In some embodiments, the messages exchanged among the MUCID 301 and the docking station 140 are binary messages. The sounds daemon 435 is responsible for sending/receiving data streams to the audio devices (not shown, e.g., speaker, microphone, handset, headset) that may be present in the docking station 140. In the docked mode, the sounds daemon interfaces the MUCID 301 using TCP/IP and UDP/IP (User Datagram Protocol/Internet Protocol) through the connection made by connecting the docking station interface 320 to the mobile interface 410. The web admin interface 440 provides the required user interface for configuring the docking station 140 through an administrator system 450. The web admin 410 is implemented as a web based application on the docking station and interfaces the docking station commands daemon 435 through Linux named pipes. In some embodiments, the docking station 140 is only used when the mobile device is docked.

Figure 5:
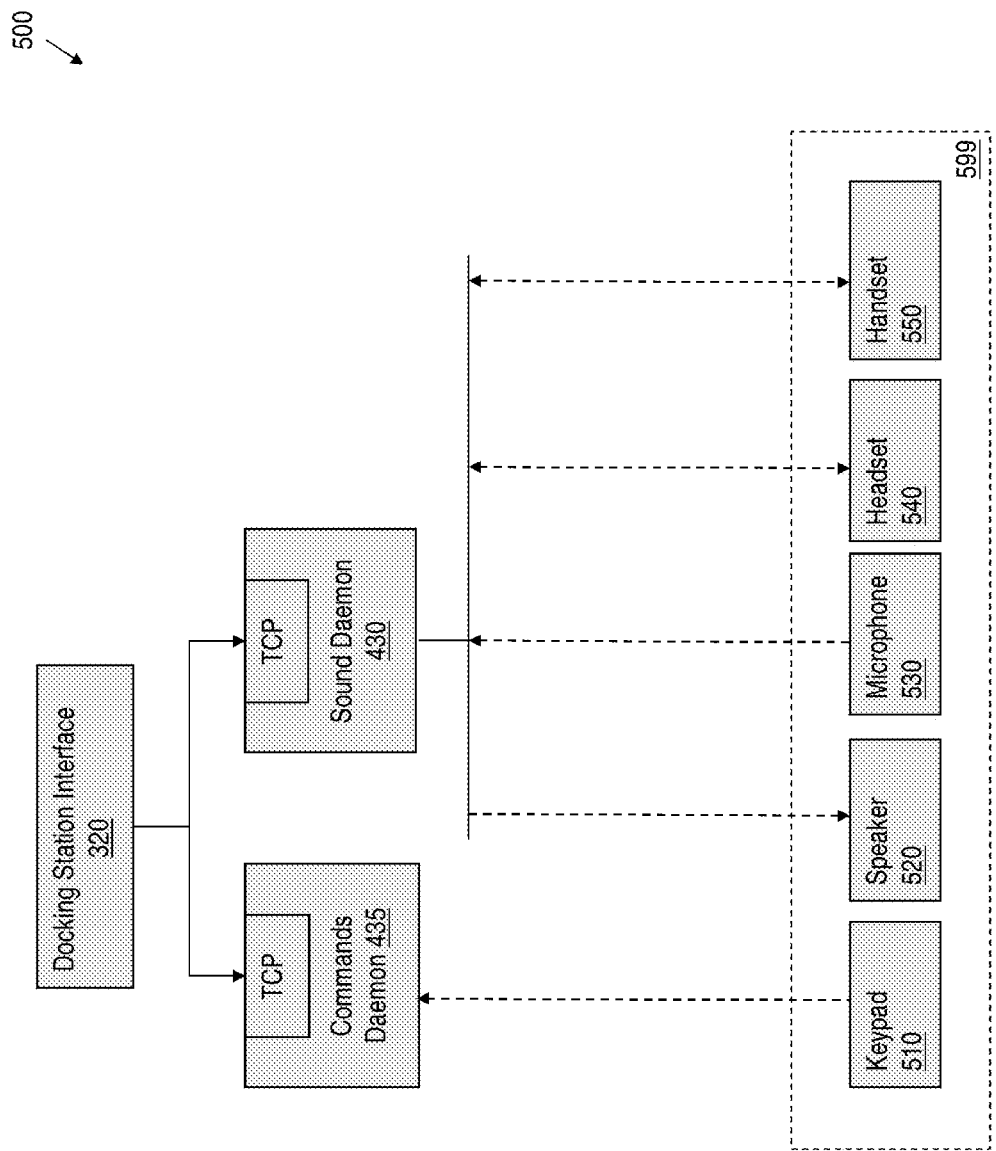
FIG. 5 is a block diagram of a docking station according to an example embodiment disclosed herein.

FIG. 5 is a block diagram 500 of the docking station 140 (shown in FIG. 1 and FIG. 4) according to an example embodiment disclosed herein. The docking station interface 320, as noted above, provides communication among the docking station 140 and the mobile device 150 while in the docked mode. Further, as explained the commands daemon 430 is used to send/receive commands to the MUCID 301 (from command devices, such as a keypad 510) and the sounds daemon 435 is responsible for sending/receiving data streams to the audio devices 599.

The audio devices may include, but are not limited to a speaker 520, a microphone 530, a headset 540, and a handset 550. In some embodiments, in the docked mode, these audio devices are connected to the enterprise PBX 180 and provide the mobile device 150 user with access to features of the enterprise PBX 180 via the mobile device 150.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
a docking station having a connection to an enterprise network, and a physical interface for connecting to a mobile communications device,
wherein the docking station is configured to:
in response to docking a mobile communications device to the physical interface, establish a network connection between the mobile communications device and a Private Branch Exchange (PBX) via the docking station connection to the enterprise network;

in response to disabling a feature of the docked mobile communications device and any PBX device linked to the mobile communications device, obtain from the enterprise network a configuration file of the mobile communications device;

facilitate application of the configuration file to the mobile communications device; and facilitate registration of the mobile device as a session initiation protocol agent via the PBX; and a trigger comprising a user input/output device, wherein the trigger is configured to:

indicate via the user input/output device completion of disabling of the feature and the completion of the session initiation protocol registration; and upon activation of the user input/output device, initiate transferring of a communication call between the mobile communications device and the PBX via the established network connection between the mobile communications device and the PBX.

2. The system of claim 1, wherein the trigger is further configured to:

upon activation, initiate transferring of a communication call initiated on the mobile communications device over the PBX via the established network connection.

3. The system of claim 1, wherein the trigger is further configured to:

upon activation, initiate transferring of an active communications call being carried over the PBX to the mobile communications device via the established network connection.

4. The system of claim 1, wherein the trigger is further configured to:

output an indication of completion of the transferring of the communication call.

5. The system of claim 1, wherein the feature is simultaneous ringing of the docked mobile communications device and any PBX device linked to the mobile communications device.

6. A system comprising:

a docking station having a connection to a Private Branch Exchange (PBX) via an enterprise network connection and an interface for docking a mobile communications device to the docking station, wherein the docking station is configured to:

in response to docking of a mobile communications device to the docking station, establish a network connection between the mobile communications device and a plurality of communications devices via the enterprise network connection of the docking station to the PBX, the plurality of communications devices including a PBX communications device connected to the PBX;

disable a feature of the docked mobile communications device and any PBX device linked to the mobile communications device; and in response to the disabling of the feature, facilitate application of a configuration file to the mobile communications device; and a trigger comprising a user input/output device, wherein the trigger is configured to:

upon activation of the trigger by a user, initiate transferring of an active communication call from the mobile communications device to the PBX communications device connected to the PBX via the established network connection between the mobile communications device and the PBX communications device;

upon activation of the trigger, trigger registration of the mobile communications device with a Session Initiation Protocol (SIP) agent via the established network connection; and indicate via the user input/output device completion of disabling of the feature and the completion of the SIP registration.

7. The system of claim 6, wherein the trigger is further configured to:

upon activation of the trigger, initiate forwarding of incoming communication calls to a mobile device number (MDN) associated with the mobile communications device to the PBX communications device.

8. The system of claim 6, wherein the trigger is further configured to:

upon activation of the trigger, initiate prevention of simultaneous ringing of the mobile communications device and the PBX communications device.

9. The system of claim 6, wherein the trigger is further configured to:

upon activation of the trigger, initiate transferring of an incoming communication call of the PBX communications device to the mobile communications device.

10. The system of claim 6, wherein the trigger is further configured to:

upon activation of the trigger, initiate transferring of an active communication call of the PBX communications device from the PBX communications device to the mobile communications device.

11. The system of claim 6 wherein the trigger is further configured to:

issue an indication of completion of the transfer of the communication call.

12. A method comprising:

docking a mobile communications device into a docking station, wherein the docking station is connected to an enterprise network via a docking station enterprise network connection prior to the docking of the mobile communications device into the docking station;

in response to docking the mobile communications device into a physical interface of the docking station, establishing an enterprise network connection between a plurality of communications devices via the docking station enterprise network connection, the plurality of communications devices including the mobile communications device and a Private Branch Exchange (PBX) communications device, wherein the PBX communications device is connected to an enterprise PBX;

in response to disabling a feature of the docked mobile communications device and any PBX device linked to the mobile communications device, obtaining from the enterprise network a configuration file of the mobile communications device;

facilitating application of the configuration file to the mobile communications device;

registering the mobile device as a session initiation protocol agent via the established network connection;

indicating, via a user input/output device, completion of the disabling of the feature and the completion of the session initiation protocol registration; and initiating transferring of a communication call among the PBX communications device connected to the enterprise network and the mobile communications device via the established enterprise network connection.

13. The method of claim 12 wherein establishing the network connection among the plurality of communications devices includes connecting the mobile device and the PBX communications device via at least one physical interface.

14. The method of claim 12 wherein initiating transferring of the communication call includes initiating transferring of an incoming communication call to a mobile device number (MDN) associated with the mobile communications device to the PBX communications device.

15. The method of claim 12 further including preventing simultaneous ringing of the mobile communications device and the PBX communications device.

16. The method of claim 12 wherein initiating transferring of the communication call includes initiating transferring of an active communication call of the PBX communications device from the PBX communications device to the mobile communications device.

17. The method of claim 12 further including issuing an indication of completion of transfer of the communication call.

18. The method of claim 12 further including initiating transferring of a communication call using an interface application of the mobile communications device.

\* \* \* \* \*